Figure 1:
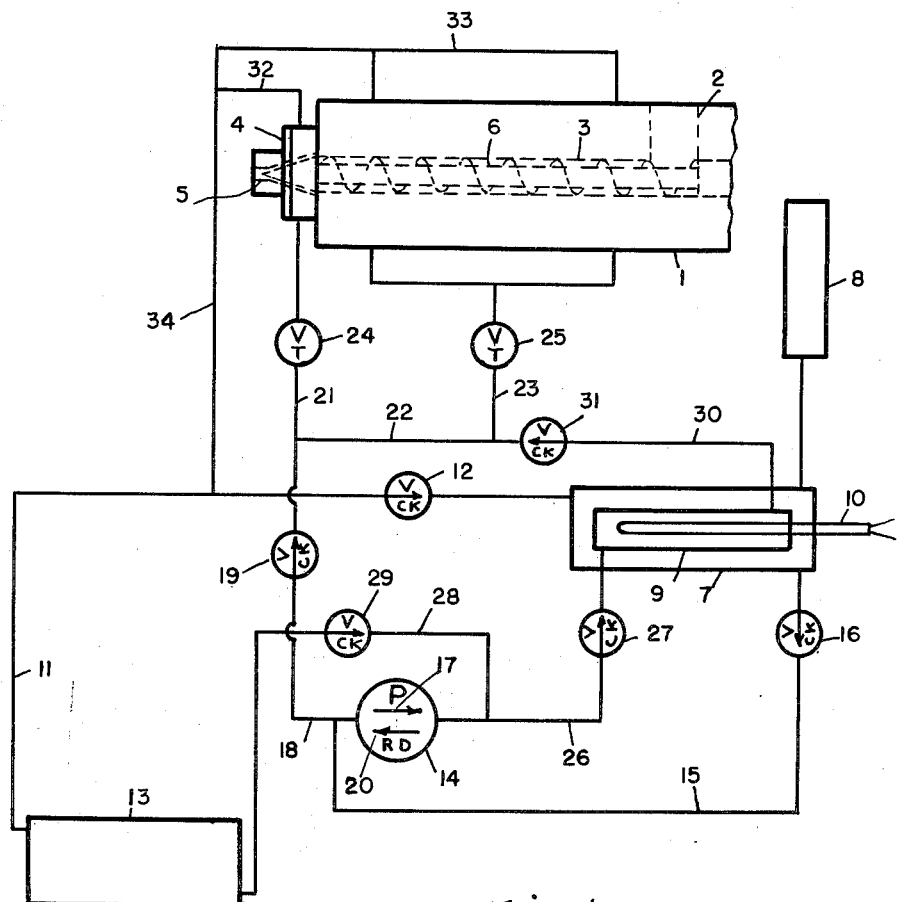

June 17, 1952        H. E. BUECKEN        2,600,842
TEMPERATURE CONTROLLED FLUID SUPPLY APPARATUS
Filed Sept. 22, 1948        3 Sheets-Sheet 1

INVENTOR.
HANS E. BUECKEN
BY
Oberlin + Limbach
ATTORNEYS.

June 17, 1952          H. E. BUECKEN          2,600,842
TEMPERATURE CONTROLLED FLUID SUPPLY APPARATUS
Filed Sept. 22, 1948          3 Sheets-Sheet 2

INVENTOR.
HANS E. BUECKEN
BY
Oberlin & Limbach
ATTORNEYS.

June 17, 1952  H. E. BUECKEN  2,600,842
TEMPERATURE CONTROLLED FLUID SUPPLY APPARATUS
Filed Sept. 22, 1948  3 Sheets-Sheet 3

INVENTOR.
HANS E. BUECKEN
BY
Oberlin + Limbach
ATTORNEYS.

Patented June 17, 1952

2,600,842

UNITED STATES PATENT OFFICE 2,600,842

TEMPERATURE CONTROLLED FLUID SUPPLY APPARATUS

Hans E. Buecken, Akron, Ohio, assignor to National Rubber Machinery Company, Akron, Ohio, a corporation of Ohio Application September 22, 1948, Serial No. 50,640

13 Claims. (Cl. 257—10)

The present invention in its broader aspects relates simply to a temperature controlled fluid supply apparatus without regard to other equipment with which it may be associated. Hence, where specific reference is herein made to the employment of this invention in conjunction with plastic extruding machines and the like, such embodiments are to be regarded merely as illustrative in order that one may more fully comprehend the nature and distinctive features of the present invention.

In the continuous extrusion of plastic materials, one important consideration is that of maintaining an accurate temperature control of the extrusion cylinder within prescribed limits so as to assure thorough plasticization of the material to be extruded but yet without overheating thereof. However, successful heat control involves more than simply rendering the heating means operative and inoperative because in a screw-type machine, for example, the frictional heat developed by the rotation of the screw within the jacketed extrusion cylinder and its churning and pressurizing action on the plastic material spiraled therabout is often so intense that even though the circulation of heating medium through the cylinder is discontinued (or the electric power turned off in the case of electric heating means), the plastic material within the cylinder will attain a temperature sufficient to cause discoloration or decomposition of the material with the result that in the latter case noxious gases or vapors, as for example hydrochloric acid or chlorine in the case of vinyl chloride and vinylidine chloride plastics, may emanate from the plastic material, thereby causing injury to the operator of the machine and to the machine itself.

Such discoloration and decomposition of the plastic material may also occur when the machine is stopped at the end of a run as well as during the operation of the machine as aforesaid. Inasmuch as the heated wall of the extrusion cylinder is generally at a temperature somewhat greater than that required to plasticize the material, prolonged contact of the material with such heated cylinder wall when the machine is stopped will effect blistering or burning of the material with resulting discoloration and decomposition.

Briefly outlined, the apparatus constituting the present invention when exemplarily coupled with an extrusion cylinder eliminates the aforesaid problems by selectively circulating a heated and a cooled fluid medium through jackets surrounding the extrusion cylinder, whereby to effect rapid heating and cooling of the cylinder.

Accordingly, it is one primary object of this invention to provide an apparatus by which temperature modifying media at different temperatures may be selectively circulated through that portion of the apparatus which it is desired to control.

Another object is to provide an apparatus with a single reversible power means which may be selectively operated to circulate either of two temperature modifying media through a portion of the apparatus which it is desired to control.

Another object is to provide an apparatus in which a relatively cooler body of fluid is operative to isolate a hotter body of fluid from oxidation and deterioration, such cooler fluid being contained in a vented expansion tank whereby to be further operative to accommodate thermal expansion of the hotter body of fluid.

Other objects and advantages of the invention will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In the drawing:

Fig. 1 is a diagrammatic representation of a preferred form of apparatus as embodied in a screw type extruding machine; and Figs. 2 through 5 are similar diagrammatic representations of modified apparatuses.

Referring now to the drawing, and first more especially to Fig. 1, there is shown therein an extruding machine which comprises a jacketed extrusion cylinder 1 having a side opening 2 adjacent one end thereof through which opening plastic material in granular, powdered, strip or other convenient form may be introduced from a suitable hopper, not shown, into the longitudinal bore 3 through the cylinder. Attached to the other end of cylinder 1 is a die head 4 which carries an extrusion die 5 therein, said die being formed with an extrusion orifice therethrough of desired cross section size and shape. Rotatable within cylinder 1 is an extrusion screw 6 which is adapted, when rotated, to force the material introduced into the cylinder through the opening 2 forward toward the extrusion orifice in the die 5.

Cylinder 1, including die head 4, will be suitably jacketed to divide the same into a plurality of temperature zones, three being shown for convenience, namely a water cooled zone (not shown) at the hopper end of cylinder 1 whereby the material entering the cylinder is retained in a solid state to better resist back pressure, an intermediate fluid heated zone between inlet opening 2 and die head 4 wherein the temperature of the inner wall of cylinder 1 is maintained sufficiently high to cause the outer layer of the material spiraled around the extrusion screw 6 to become tacky and to adhere to the wall of cylinder 1 whereby the screw will rotate relative to the material and thus urge the same forward toward the extrusion orifice, and a second fluid heated zone at die head 4 wherein the temperature is sufficient to complete the plasticizing of the material prior to its being forced out through the extrusion orifice. Cylinder 1 and die head 4 may be heated by oil, steam or like fluid and in some cases electricity may be used as the heating means. In the present case, a preferred heating medium is hot oil which is heated and circulated through the jackets in cylinder 1 and die head 4 by the apparatus now to be described.

The temperature controlled fluid supply apparatus herein shown in association with an extruding machine comprises a fluid reservoir 7 to which is connected a vented expansion tank and seal 8 to allow for thermal expansion of the fluid in the system and as will appear hereinafter to seal the heated fluid from oxidation and deterioration. Within reservoir 7 is a heating reservoir 9 through which the fluid flows and is heated to a desired temperature as by means of an electric immersion heater 10. Heater 10 will preferably have associated therewith means for varying the temperature thereof so that the fluid flowing through the heating reservoir 9 will be heated to a desired temperature. Connected to reservoir 7, as by a conduit 11 including a check valve 12 therein, is a fluid reservoir 13 containing cold fluid which may be at room temperature or cooled to some temperature below room temperature by suitable refrigerating means, not shown.

Connected in the system is a reversible hydraulic pump 14 to one of the ports of which is connected a conduit 15 from reservoir 7 with a check valve 16 therein permitting flow of fluid from reservoir 7 to what is the intake port of the pump when the pump is operated to pump fluid in the direction indicated by the arrow 17. To this same port of the pump is connected a conduit 18 with a check valve 19 therein permitting flow of fluid from what is the delivery port of the pump when the pump is operated to pump fluid in the direction indicated by the arrow 20 to the conduits 21, 22 and 23, which when the apparatus is installed in an extruding machine as shown respectively lead to those jackets in the cylinder which constitute the die head and intermediate heating zones. In conduits 21 and 23 are regulating or throttle valves 24 and 25 for controlling the relative rates of flow of fluid through the separate jackets in cylinder 1 and die head 4.

The other port in pump 14 has connected thereto a conduit 26 with a check valve 27 therein through which fluid flows in the direction indicated by arrow 17 to one end of heating reservoir 9. Leading to this same port of pump 14 from cooling reservoir 13 is a conduit 28 with a check valve 29 therein permitting drawing of fluid from reservoir 13 by the pump when operated to pump fluid in a direction as indicated by the arrow 20. The other end of heating reservoir 9 has a conduit 30 connected thereto with a check valve 31 therein, said conduit 30 joining with conduits 22 and 23 through which heated fluid may be supplied through throttle valves 24 and 25 to the die head and intermediate heating zones. The fluid circulated through the jackets in cylinder 1 and in die head 4 leaves by way of conduits 32 and 33 which join with a conduit 34, said latter conduit in turn connecting into conduit 11. As previously mentioned, conduit 11 runs between reservoir 13 and reservoir 7.

The operation of the apparatus described above is as follows. When pump 14 is operated to circulate fluid in the direction indicated by arrow 17, fluid is drawn into the pump from reservoir 7 through conduit 15 and check valve 16 and is delivered to one end of heating reservoir 9 through conduit 26 and check valve 27. At this stage, check valves 19 and 29 are respectively operative to prevent any intake of fluid through conduit 18 or delivery of fluid through conduit 28. The fluid in passing through heating reservoir 9 is heated to a desired temperature by heater 10. The properly heated fluid then flows through conduit 30 and check valve 31 through conduits 22, 21 and 23, through throttle valves 24 and 25 into the respective jackets of the extrusion cylinder. Throttle valves 24 and 25 will, of course, be properly regulated to control the relative rates of flow of fluid into the respective jackets to thus maintain the desired temperatures of the heating zones. Check valve 19 prevents by-passing of any of the hot fluid from heating reservoir 9 to pump 14. The fluid flowed through the jackets leaves by way of conduits 32 and 33 and flows through conduit 34 and conduit 11 and check valve 12 into reservoir 7. It will be observed that the warm fluid entering reservoir 7 will, prior to again being drawn therethrough by pump 14, be conductively heated by heating reservoir 9, which in its preferred form will consist of a coiled or otherwise formed long tube immersed in the fluid in reservoir 7.

Now should the frictional heat developed by the rotating screw 3 be so great as to effect a rise in temperature greater than desired, it would be wholly unsatisfactory to simply discontinue circulation of heated fluid through the heating jackets because such temperature rise will, in some cases, continue even though circulation of heated fluid is discontinued. Also, as previously explained, stopping of the screw 3 at the end of a run will produce the undesirable result of prolonged contact between the plastic material and the heated wall of cylinder 1.

Under such circumstances, pump 14 is immediately reversed to effect flow of fluid through the pump in a direction as indicated by arrow 20 whereby cold fluid is drawn into the pump from reservoir 13 through conduit 28 and check valve 29 and delivered through conduit 18 and check valve 19 through conduits 21, 22 and 23 and through throttle valves 24 and 25 into the jackets of cylinder 1 and die head 4. At this stage of the operation, check valves 27, 16 and 31, respectively prevent drawing of fluid into pump 14 from heating reservoir 9, prevent delivery of cold fluid to reservoir 7 and prevent delivery of cold fluid to heating reservoir 9. From the heating jackets the fluid is drawn under the influence of the suction side of the pump, through conduits 32 and 33, through conduits 34 and 11 into reservoir 13, the check valve 12 preventing drawing of fluid from reservoir 7. The fluid will then be cooled in reservoir 13 and recirculated through pump 14 and the jackets, as aforesaid. It can thus be seen that with such an arrangement the temperature rise due to frictional heat or due to thermal decomposition of the material remaining in the machine on the occasion of a shut-down is quickly dissipated.

Referring now to the modification illustrated in Fig. 2, wherein elements similar to those included in the assemblage of Fig. 1 bear like reference numerals, it is apparent that when the pump 14 is operated to pump fluid in the direction indicated by the arrow 20, the fluid will be caused to flow as follows starting at the discharge side of the pump: through conduit 26, check valve 27, heating reservoir "H," conduit 30, cylinder 1, conduit 34, check valve 16, and conduit 15 leading to the suction side of the pump.

On the other hand when it becomes necessary or desirable to reduce the temperature of the cylinder 1, the operation of pump 14 is reversed to thus pump fluid in the direction indicated by the arrow 17 whereupon cold fluid drawn from the reservoir "C" through conduit 28 and check valve 29 into the pump will be discharged through conduit 18, check valve 19, cylinder 1, and conduit 11 into reservoir "C."

Figure 2:
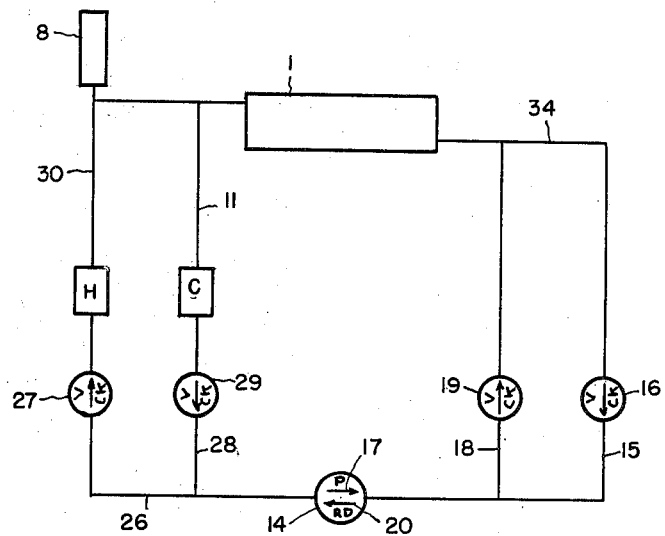

In the apparatus disclosed in Fig. 2 it will be observed that the flow of hot and cold fluid through cylinder 1 is in opposite directions whereas in the Fig. 1 apparatus both the hot and cold fluids flow through the cylinder in the same direction, such latter arrangement being preferred in some instances.

Figure 3:
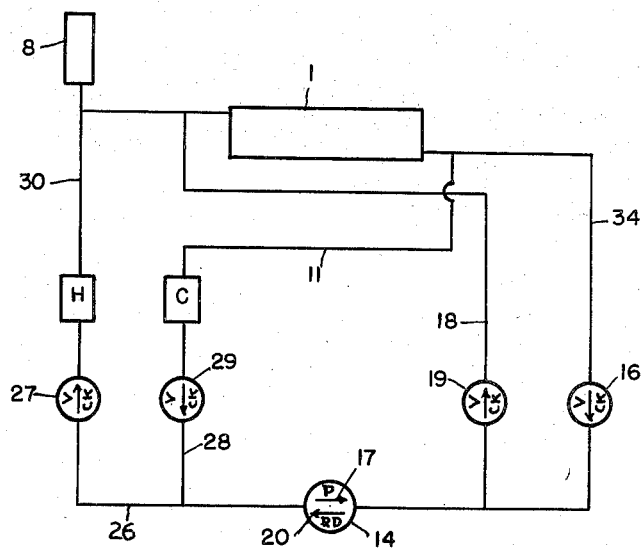

In order to convert the Fig. 2 apparatus to one in which the temperature modifying media flow through the cylinder in the same direction it is only necessary to reverse the connections of the cylinder and either of the two pairs of conduits leading from the temperature modifying media circuits. In Fig. 3 this has been illustratively accomplished simply by connecting the conduits 11 and 18 to the opposite ends of cylinder 1 as compared with their connections in Fig. 2. Because such change as illustrated in Fig. 3 does not cause any conflict with the aforedescribed mode of operation of the Fig. 2 apparatus, such need not now be repeated.

A further modification (not shown) which reduces the apparatus of Fig. 2 to a still simpler form involves the replacement of the valves 16 and 19 and the conduits 15 and 18 therein by a single conduit between pump 14 and cylinder 1. However, in such modification the length (or more properly, the fluid capacity) of such single conduit should be a minimum, otherwise excessive heat losses may result from the additional body of hot and cold fluid respectively circulated through the reservoirs "C" and "H" when the operation of the pump is reversed and from the increased heat exchange between the walls of such conduit and the hot and cold fluid alternately circulated therethrough.

Figure 4:
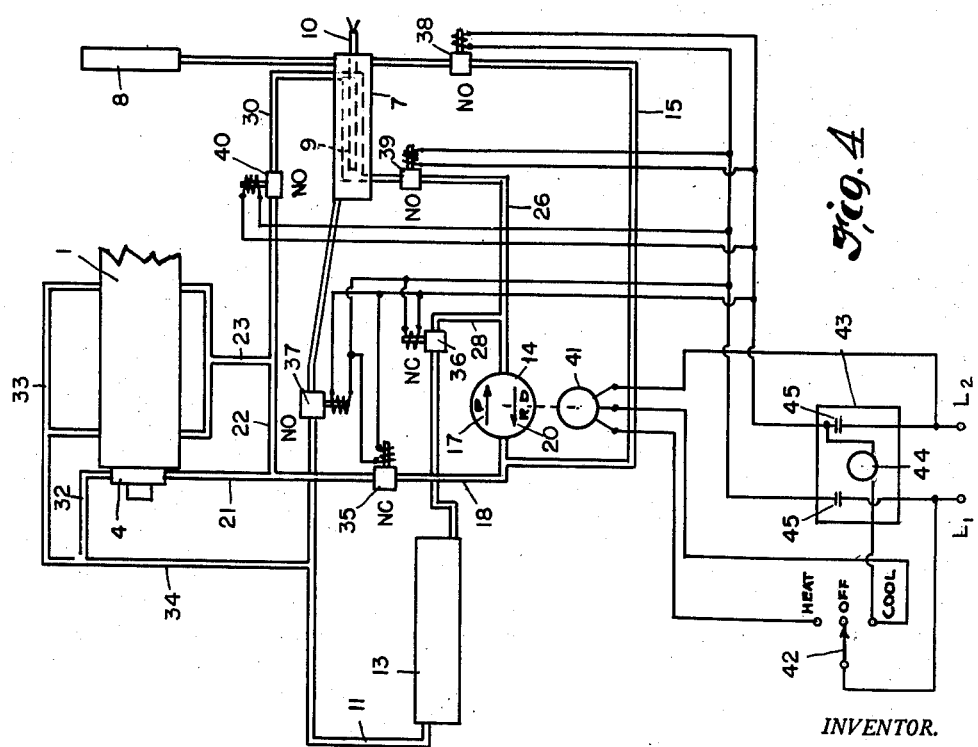

The embodiment of the invention illustrated in Fig. 4 is substantially the same as that of Fig. 1 with the exception that normally closed solenoid valves 35 and 36 and normally open solenoid valves 37, 38, 39 and 40 in the former have been substituted for the check valves 19 and 29 and 12, 16, 27 and 31 respectively. Said solenoid valves are of conventional construction wherein the solenoid armature when moved in response to energization of the associated solenoid effects corresponding movement of the valve seating element to a flow permitting position in the case of the normally closed valves 35 and 36 and to a seating position in the case of the normally open valves 37 to 40. Upon deenergization of the solenoids the valve seating elements are moved to the normally seated or unseated position as by springs. In Fig. 4 the pump driving motor 41 is controlled through a reversing switch 42 which in one position energizes the control relay 43 comprising a coil 44 and normally open switches 45, which switches are actuated in well known manner to a closed position when coil 44 is energized.

When the switch 42 is in the "off" position the motor 41 is not operating. However, when switch 42 is shifted to the "Heat" position the motor 41 is operative to rotate the pump 14 in a direction to cause flow of oil in the direction indicated by the arrow 17, the relay 43 not being energized whereupon the solenoid valves 35 to 40 remain in their normally open or closed positions as indicated by the letters "N. O." and "N. C." in Fig. 4. Therefore, commencing at the discharge port of the pump 14 fluid flows through conduit 26, normally open valve 39, heating reservoir 9, conduit 30, normally open valve 40, conduits 22, 21 and 23 through the cylinder 1 and head 4, conduits 32, 33, 34 and 11, normally open valve 37, through reservoir 7, conduit 15, and normally open valve 38 into the intake port of the pump.

When the switch 42 is shifted to the "Cool" position the motor 41 operates in the opposite direction to cause the pump 14 to circulate fluid in the direction of the arrow 20 and the relay 43 is energized to close the switches 45 and consequently energize the solenoid valves 35 to 40, valves 35 and 36 being actuated to open position and valves 37 to 40 to closed position. Therefore, cool fluid from reservoir 13 is drawn into the pump 14 through conduit 28 and valve 36 and discharged through the conduit 18, valve 35, conduits 21, 22 and 23, and through cylinder 1 and head 4, conduits 32, 33, 34, and 11 into the reservoir 13.

Figure 5:
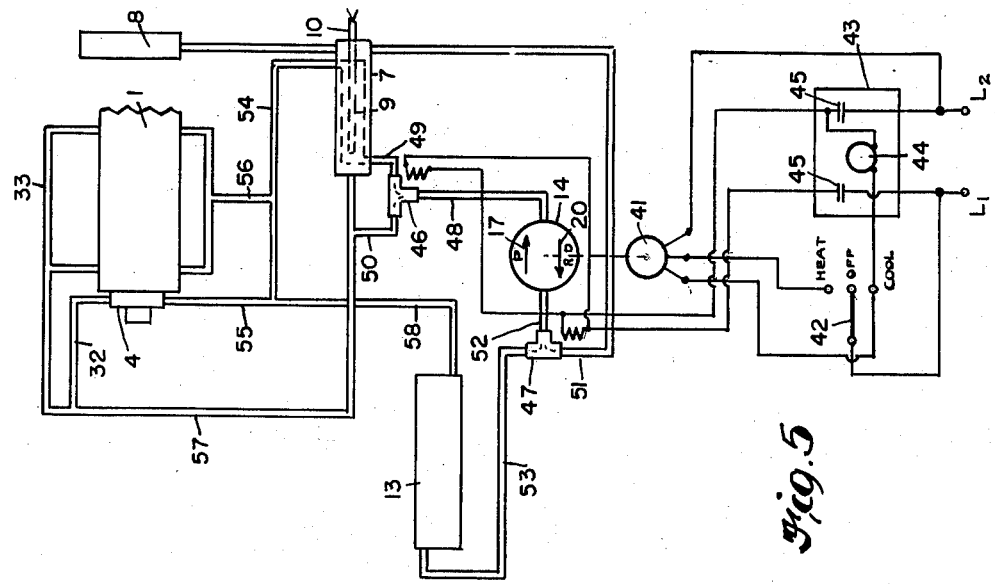

The form of apparatus illustrated in Fig. 5 is similar to that of Fig. 4 differing slightly in the piping and in that two three-way solenoid operated valves 46 and 47 in the former take the place of the six solenoid operated valves 35 to 40 in the latter. In Fig. 5, the actuation of switch 42 to the "Heat" position operates the motor 41 in a direction to cause the pump 14 to circulate fluid in the direction of the arrow 17, the solenoid valve 46 being retained as by a spring in a position permitting flow of fluid through conduits 48 and 49 and heating reservoir 9 and closing flow through conduits 48 and 50 and solenoid valve 47 being similarly retained in a position permitting drawing of fluid from reservoir 7 through conduits 51 and 52 and closing flow through conduits 52 and 53. Thus, heated fluid flows from reservoir 9 through conduits 54, 55 and 56, cylinder 1 and head 4, conduits 32, 33 and 57 into the reservoir 7. When the switch 42 is actuated to the "Cool" position, the motor 41 drives the pump 14 in the opposite direction to cause fluid to flow in the direction indicated by arrow 20 and the relay 43 is energized closing switches 45 and energizing the solenoids associated with valve 46 and 47 whereupon the latter are respectively actuated to a position opening communication between conduits 48 and 50 and closing communication between conduits 48 and 49 and to a position opening communication between conduits 52 and 53 and closing communication between conduits 52 and 51. With the valves 46 and 47 thus actuated, cool fluid is drawn through the pump from reservoir 13 through conduits 58, 55 and 56, cylinder 1 and head 4, conduits 32, 33, 57, and 50, valve 46 and conduit 48 and forced by the pump through conduits 52 and 53 through valve 47 into reservoir 13.

The valves 46 and 47 are of any well known form and therefore it has been deemed unnecessary to describe the construction thereof in detail. As in the case of the solenoid valves 35 to 40 in Fig. 4, the valves 46 and 47 are such that springs therein are operative to return the valve elements therein to a normal position, as indicated, upon deenergization of the solenoids associated with said valves.

As previously indicated, the vented expansion tank and seal 8 is operative not only to accommodate thermal expansion of the heated fluid in the system but in addition to provide a seal whereby such heated fluid is protected from oxidation and deterioration. By reference to each of the figures of the drawing it can be seen that said tank 8 is disposed exteriorly of the heating reservoirs 7, 9, and "H," and that no fluid is circulated therethrough. Thus, the fluid therein which is exposed to air will be relatively cooler whereby when oil or like fluid is employed as the temperature modifying medium such body of fluid will not objectionably oxidize or deteriorate and because the heated fluid is nowhere exposed to air, the entire system is protected from contamination. Such body of fluid in tank 8 thus operates as a fluid plug to seal the system except for the small surface area of the fluid in said tank.

Other modes of applying the principle of the invention may be employed, change being made as regards the details described, provided the features stated in any of the following claims or the equivalent of such be employed.

I therefore particularly point out and distinctly claim as my invention:

1. In a temperature controlled fluid supply apparatus, the combination of a unit through which hot or cold fluid is adapted to be selectively circulated, a reversible pump, hot and cold fluid systems connected to said unit and to said pump, a valve in one system respectively opened and closed upon operation of said pump in one direction and in the other to respectively permit and block circulation of fluid through said system and unit, and a valve in the other system respectively closed and opened upon operation of said pump as aforesaid to respectively block and permit circulation of fluid through said other system and said unit.

2. In a temperature controlled fluid supply apparatus, the combination of a unit through which fluid from one of two fluid circuits containing fluids at different temperatures is adapted to be selectively circulated, a reversible pump, a first fluid circuit connected in series with said pump and said unit, a second fluid circuit connected in series with said pump and said unit, and a valve in said first circuit respectively opened and closed upon operation of said pump in one direction and in the other to respectively permit and block circulation of fluid through said circuit and unit, and a valve in said second circuit respectively closed and opened upon operation of said pump as aforesaid to respectively block and permit circulation of fluid through said second circuit and said unit.

3. In a temperature controlled fluid supply apparatus, the combination of a unit through which fluid from one of two fluid circuits containing fluids at different temperatures is adapted to be selectively circulated, a reversible pump formed with a pair of ports which are alternately intake and delivery ports in accordance with the direction of operation of said pump, said unit being formed with an inlet port and on outlet port, a first fluid circuit connected in series with said pump and with the inlet and outlet ports of said unit, a second fluid circuit connected in series with said pump and with the inlet and outlet ports of said unit, and a valve in each circuit adjacent the inlet port of said unit alternately and automatically opened and closed in accordance with the direction of operation of said pump and arranged to permit flow of fluid from one circuit through said unit and to block flow of fluid from the other circuit through said unit.

4. In a temperature controlled fluid supply apparatus, the combination of a unit through which fluid from one of two fluid circuits containing fluids at different temperatures is adapted to be selectively circulated, a reversible pump formed with a pair of ports which are alternately intake and delivery ports in accordance with the direction of operation of said pump, said unit being formed with an inlet port and an outlet port, a first fluid circuit connected in series with said pump and with the inlet and outlet ports of said unit, a second fluid circuit connected in series with said pump and with the inlet and outlet ports of said unit, and a valve in each circuit, one of which is adjacent one of the ports of said pump and the other of which is adjacent the other of the ports of said pump, said valves being alternately and automatically opened and closed in accordance with the direction of operation of said pump and arranged to permit flow of fluid from one circuit through said unit and to block flow of fluid from the other circuit through said unit.

5. In a temperature controlled fluid supply apparatus, the combination of a unit through which fluid from one of two fluid circuits containing fluids at different temperatures is adapted to be selectively circulated, a reversible pump formed with a pair of ports which are alternately intake and delivery ports in accordance with the direction of operation of said pump, said unit being formed with an inlet port and an outlet port, a first fluid circuit connected in series with said pump and with the inlet and outlet ports of said unit, a second fluid circuit connected in series with said pump and with the inlet and outlet ports of said unit, and a pair of valves in each circuit on opposite sides of said pump alternately and automatically opened and closed in response to operation of said pump in opposite directions and arranged to restrict intake and delivery of fluid into and from said pump to one or the other of said circuits.

6. In a temperature controlled fluid support apparatus, the combination of a unit adapted to have selectively circulated therethrough temperature modifying media at different temperatures, a reversible pump, a pair of circuits containing media at different temperatures and connected in series with said unit and pump, and check valves in each circuit on opposite sides of said pump, the check valves in one of said circuits operating in a direction permitting circulation of medium therein through said unit and pump when said pump is operated in one direction and preventing such circulation of medium when said pump is operated in the opposite direction, and the check valves in the other of said circuits operating in a direction respectively preventing and permitting circulation of medium therein through said unit and pump when said pump is operated in such one direction and opposite direction as aforesaid.

7. In a temperature controlled fluid supply apparatus, the combination of a unit adapted to have selectively circulated therethrough temperature modifying media at different temperatures, a reversible pump, a pair of circuits containing media at different temperatures and connected in series with said unit and pump, and check valves in each circuit on opposite sides of said pump, the check valves in one of said circuits opening in one direction permitting circulation of medium therein through said unit and pump when said pump is operated in one direction, and the check valves in the other of said circuits opening in an opposite direction permitting circulation of medium therein through said unit and pump when said pump is operated in an opposite direction.

8. In a temperature controlled fluid supply apparatus, the combination of a unit through which fluid from one of two fluid supply circuits containing fluids at different temperatures is adapted to be selectively circulated, a reversible pump formed with a pair of ports which are alternately intake and delivery ports in accordance with the direction of operation of said pump, a first fluid supply circuit connected in series with said pump and unit, a second fluid supply circuit connected in series with said pump and unit, and check valves in each circuit on opposite sides of said pump, the check valves in one of said circuits opening in a direction toward and away respectively from the intake and delivery ports of said pump when said pump is operated in one direction to circulate fluid therein through said pump and unit, and the check valves in the other of said circuits opening in a direction toward and away respectively from the intake and delivery ports of said pump when said pump is operated in an opposite direction to circulate fluid therein through said pump and unit.

9. In a temperature controlled fluid supply apparatus, the combination of a unit adapted to have circulated therethrough temperature modifying media at different temperatures, a reversible pump, a reversible electric motor for driving said pump in opposite directions, a pair of fluid circuits containing media at different temperatures and interconnecting said pump and said unit for circulation of said media by said pump through said unit, solenoid operated valves in said circuits actuatable to selectively permit circulation of such media through said unit and pump, and a switch connected to said motor and valves whereby said valves are predeterminedly actuated in accordance with the direction of operation of said motor to permit circulation of one of such media through said unit when said motor, and thus said pump, is operated in one direction and to permit circulation of the other of such media through said unit when said motor, and thus said pump, is operated in the opposite direction.

10. The structure according to claim 1 further characterized in that one of said systems includes a first reservoir for fluid, means for heating the fluid in said first reservoir, and a second reservoir for fluid in heat exchange relation with said first reservoir, said reservoirs being so disposed that fluid is circulated by operation of said pump in one direction successively through said first reservoir, said unit, and said second reservoir.

11. The structure according to claim 6 further characterized in that one of said circuits includes a reservoir for temperature modifying medium, and means for heating the medium in said reservoir, said reservoir being so disposed that medium is circulated by operation of said pump in one direction successively through said reservoir and said unit, and then back through said reservoir to said pump.

12. The structure according to claim 11 further characterized in that there are four check valves in said one circuit, two respectively located between said reservoir and the opposite sides of said pump and two located respectively between said reservoir and the opposite sides of said unit.

13. The structure according to claim 6 further characterized in that the other of said circuits includes a reservoir for another temperature modifying medium between said unit and pump, and that there are two check valves in said other circuit respectively located between the reservoir therein and one side of said pump and between one side of said unit and the other side of said pump, said last-named check valves being closed during operation of said pump in such one direction and open during operation of said pump in the other direction.

HANS E. BUECKEN.

REFERENCES CITED

The following references are of record in the file of this patent:

UNITED STATES PATENTS

| Number | Name | Date |
| --- | --- | --- |
| 1,516,968 | Johnson | Nov. 25, 1924 |
| 1,717,814 | Strong et al. | June 18, 1828 |
| 2,121,625 | Crago | June 21, 1938 |
| 2,189,941 | Cornell | Feb. 13, 1940 |
| 2,309,943 | Ernst | Feb. 2, 1943 |
| 2,414,339 | Skaggs et al. | Jan. 14, 1947 |
| 2,483,021 | Oaks | Sept. 27, 1949 |